United States Patent
Sambotin et al.

(10) Patent No.: US 10,977,095 B2
(45) Date of Patent: Apr. 13, 2021

(54) SIDE-BY-SIDE EXECUTION OF SAME-TYPE SUBSYSTEMS HAVING A SHARED BASE OPERATING SYSTEM

(71) Applicant: Microsoft Technology Licensing, LLC, Redmond, WA (US)

(72) Inventors: Dragos C. Sambotin, Sammamish, WA (US); Philippe Alain Joubert, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/206,368

(22) Filed: Nov. 30, 2018

(65) Prior Publication Data

US 2020/0174850 A1  Jun. 4, 2020

(51) Int. Cl.
*G06F 3/00* (2006.01)
*G06F 9/54* (2006.01)
*G06F 8/61* (2018.01)
*G06F 9/38* (2018.01)
*G06F 9/4401* (2018.01)
*G06F 9/48* (2006.01)

(52) U.S. Cl.
CPC .............. *G06F 9/541* (2013.01); *G06F 8/64* (2013.01); *G06F 9/3867* (2013.01); *G06F 9/4406* (2013.01); *G06F 9/4806* (2013.01); *G06F 9/545* (2013.01)

(58) Field of Classification Search
CPC ..................................................... G06F 9/541
USPC .......................................................... 719/328
See application file for complete search history.

(56) References Cited

U.S. PATENT DOCUMENTS

| | | | |
|---|---|---|---|
| 6,253,257 B1* | 6/2001 | Dundon | G06F 9/44521 719/328 |
| 6,763,458 B1 | 7/2004 | Watanabe et al. | |
| 7,818,443 B2 | 10/2010 | Du et al. | |
| 8,171,280 B2 | 5/2012 | Laue | |
| 8,522,004 B2 | 8/2013 | Borras et al. | |
| 8,615,766 B2 | 12/2013 | Gounares | |
| 8,719,836 B2 | 5/2014 | Groschel et al. | |
| 8,763,018 B2* | 6/2014 | Pope | G06F 9/546 719/328 |
| 8,843,733 B2 | 9/2014 | Durham | |
| 9,086,839 B2 | 7/2015 | Griffin | |
| 9,244,728 B2 | 1/2016 | Shao et al. | |
| 9,389,877 B2 | 7/2016 | Galicia et al. | |

(Continued)

OTHER PUBLICATIONS

Vadym Borovskiy, Resolving Incompatibility During the Evolution of Web Services With Message Conversion. (Year: 2008).*

(Continued)

*Primary Examiner* — Lechi Truong
(74) *Attorney, Agent, or Firm* — Holzer Patel Drennan

(57) ABSTRACT

A method for executing includes loading multiple application programming interface (API) set schemas into memory. A first one of the API schemas resolves an API set contract to a first host binary and a second one of the API set schemas resolves the API set contract to a different host binary. The method further includes executing elements of the first host binary responsive to receipt of an API call identified by the API set contract that is received within a first runtime context and executing elements of the second host binary responsive to receipt of the API call within a second runtime context.

11 Claims, 5 Drawing Sheets

(56) References Cited

U.S. PATENT DOCUMENTS

| | | | |
|---|---|---|---|
| 9,569,195 B2 | 2/2017 | Schekochikhin | |
| 9,898,354 B2 | 2/2018 | Engel et al. | |
| 10,387,223 B2* | 8/2019 | Nadig | G06F 8/36 |
| 2007/0180509 A1 | 8/2007 | Swartz et al. | |
| 2013/0297924 A1 | 11/2013 | Laue et al. | |
| 2014/0366045 A1* | 12/2014 | West | G06F 9/54 |
| | | | 719/328 |
| 2016/0328817 A1* | 11/2016 | Yin | G06T 1/20 |
| 2018/0217847 A1 | 8/2018 | Katchapalayam et al. | |

OTHER PUBLICATIONS

Jose Reyero, Introduce config context to make original config and different overrides accessible. (Year: 2012).*

Gerofi, et al, "PicoDriver: fast-path device drivers for multi-kernel operating systems" Proceedings of the 27th International Symposium on High-Performance Parallel and Distributed Computing, pp. 2-13, Publishing Date: Jun. 11, 2018.

"International Search Report and Written Opinion Issued in PCT Application No. PCT/US19/062898", dated Mar. 4, 2020, 12 Pages.

"Lesson 2. Support of 32-bit applications in the 64-bit Windows environment", Retrieved from: http://web.archive.org/web/20171221090617/.viva64.com/en/l/0002/, Dec. 21, 2017, 3 Pages.

Jacobs, et al., "Running 32-bit Applications", Retrieved from: https://docs.microsoft.com/en-us/windows/win32/winprog64/running-32-bit-applications, May 31, 2018, 2 Pages.

Satran, Michael, "WOW64 Implementation Details", Retrieved from: https://docs.microsoft.com/en-us/windows/win32/winprog64/wow64-implementation-details, May 31, 2018, 3 Pages.

* cited by examiner

SIDE-BY-SIDE EXECUTION OF SAME-TYPE SUBSYSTEMS HAVING A SHARED BASE OPERATING SYSTEM

BACKGROUND

The number of mobile electronic devices in the home has significantly increased in recent years. It is not uncommon for a user to have two or more personal devices for executing local and/or cloud-based applications. The evolution of the mobile electronics industry has compelled the design and market production of multiple different types of operating systems. Some operating systems are designed with higher memory requirements to support local execution of memory-intensive applications, such as applications for gaming and graphics design. Other operating systems have been designed with lower memory requirements for integration into less expensive and less powerful electronics. In some cases, these different operating systems share the same code base and are closely related, such as Windows Desktop and the Windows Mobile.

Applications utilize application programming interfaces (APIs) to communicate with an operating system and to command hardware elements to perform processing operations and render graphics. The particular set of API calls that an application is designed to utilize may be compatible with a single operating system.

Currently, there exist a limited number of solutions for running applications designed for different operating systems on a same device. The most common solution is to use a virtual machine that allows two different operating systems to execute side-by-side. However, it is highly memory intensive to simultaneously run two full operating systems including their respective kernels and the various drivers of the two different systems.

SUMMARY

Figure 1:
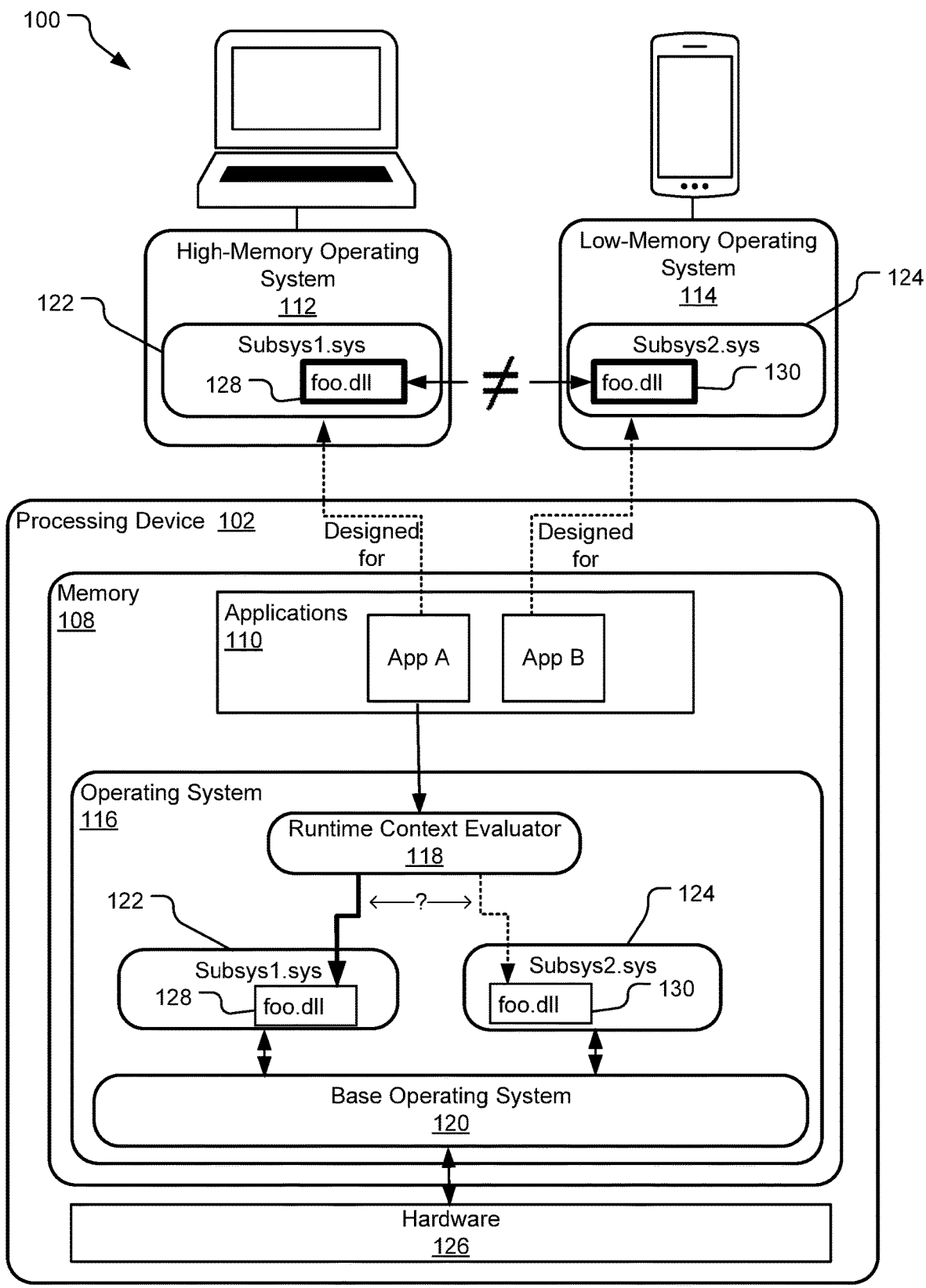
FIG. 1 illustrates an example system for side-by-side execution of same-type subsystems running on a same base operating system.

A method for co-executing same-type subsystems on a same base operating system provides for loading a first API set schema and a second API set schema into memory. The first API set schema resolves an API set contract to a first host binary and the second API set schema resolves the API set contract to a second different host binary. The method further provides for executing elements of the first host binary responsive to receipt of a API call identified within the API set contract that is placed within a first runtime context and executing elements of the second different host binary responsive to receipt of the API call placed within a second runtime context.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DESCRIPTION

When an application sends commands to an operating system (OS) to initiate processing operations or render graphics, those commands are received and processed by a high-level subsystem that translates the commands into lower-level commands and, eventually, hardware control signals. A high-level subsystem may be built to interpret a particular set of function calls referred to as an API set and to resolve those API function calls to corresponding binary executables.

Different operating systems may include different subsystems of a same type that are built to utilize different API sets. As used herein, "subsystem" refers to a subset of the functionality provided by an operating system (e.g. graphics, audio, wireless LAN, etc.). Two operating systems are referred to as being a "same type" of subsystem when they are designed to provide the same subset of the operating system functionality, such as graphics rendering, audio production, etc. For example, Windows 10 is a Microsoft operating system designed for desktop computing devices while Windows Mobile is a Microsoft operating system designed to run on lower-memory devices, such as phones and tablets. Windows 10 includes a first graphics subsystem, win32kfull.sys, and Windows Mobile includes a second graphics subsystem, win32kmin.sys. Each of these same-type subsystems utilizes a different API set when communicating with its compatible applications and lower-level operating system components.

An API set is typically globally defined at the operating system level. For example, a first graphics subsystem in an electronic device may support a set of APIs defined in a contract "foo.dll." Regardless of which applications call APIs from the foo.dll contract, the operating system of the device maps this contract to a same host binary file that that is executed by the graphic subsystem upon receipt of the application call to "foo.dll." Different subsystems of a same type (such as the same-type graphics subsystems win32kmin.sys and win32kfull.sys) may support different API sets that have some duplicative contract names and/or duplicative function names intended to correspond to different host binaries. For example, a higher memory graphics subsystem (e.g., win32kfull.sys) and a lower memory graphics subsystem (win32 min.sys) may each define a function named "drawshape.dll" that is utilized to call a different executable and render a different type of graphic. This illustrates one challenge of designing a modern operating system that can run diverse applications initially written for compatibility with different operating systems.

The disclosed technology allows two or more applications designed for different operating systems to be executed simultaneously within one system running a single instance of a base operating system. For example, the system runs a single base operating system and side-by-side versions of a same-type subsystems that utilize different API sets to communicate with compatible applications. As used herein, the term "base operating system" refers to at least an operating system kernel and kernel-mode device drivers that enable the kernel to interact with hardware devices.

The capability of executing multiple same-type subsystems (e.g., graphics subsystems) on top of a same base operating system improves the computer system by reducing the amount of memory that is consumed when co-executing applications designed for different operating systems. For example, this eliminates the need to use a virtual machine to execute a full, second operating system alongside a primary operating system executing on the host.

According to one implementation, the foregoing is accomplished, in part, by a software tool that evaluates the context in which an API call is placed. In one implementation, the context is evaluated on a per-application basis (e.g., context evaluation returns a same value for each call made by an application). Based on the associated context of a call to an API element, the API element is interpreted as belonging to a select one of multiple pre-loaded API set schemas. In essence, this allows a same API (function) call to be mapped to a first host binary when called within a first context and mapped to a second host binary when called within a second context.

FIG. 1 illustrates a first example system 100 for side-by-side execution of multiple same-type subsystems running on a same base operating system. The system 100 includes a processing device 102 and hardware 126 (such as a processor, display, etc.) and memory 108. The memory 108 stores an operating system 116 including a base operating system 120 and at least two same-type subsystems (e.g., subsystems 122, 124) that utilize different API sets to when interfacing with one or more applications 110 of a supported subset. Although other implementations are contemplated, the first subsystems 122, 124 are, in one implementation, subsystems that communicate with the base operating system 120 to render graphics and/or to perform compute operations in responsive to API calls initiated by one or more of the applications 110. For example, the first subsystem 122 may utilize a first API (e.g., set of functions) to initiate graphics rendering operations for a first subset of the applications 110 and the subsystem 124 may utilize a second API to initiate graphics rendering operation for a second subset of the applications 110.

The system 100 allows a user (not shown) to interact with at least two of the applications 110—App A and App B that are initially designed for compatibility with two different operating systems. App A is an application initially designed for compatibility with and use on a processing device running a high-memory operating system 112. For example, the high-memory operating system 112 may be an operating system designed for a desktop computer such as Windows 10. The high-memory operating system 112 includes an instance of the first subsystem 122, which is also included within the operating system 116 of the processing device 102.

In contrast to App A, App B is an application initially designed for compatibility with and use on a processing device running a low-memory operating system 114 (as compared to the memory requirements of the high-memory operating system 112). For example, the low-memory operating system 114 may be an operating system designed for a light-weight mobile phone or tablet with reduced memory and/or processing power as compared to a desktop computer that executes the high-memory operating system 112. The low-memory operating system 114 includes an instance of the second subsystem 124, which is also included within the operating system 116 of the processing device 102.

App A is a software executable that, at run-time, declares it consumes multiple contracts including, for example, a first API set contract 128. As used herein, "API set contract" refers to an API set name corresponding to a declared set of API functions. In one implementation, the first API set contract is part of a first API set schema that is globally defined in the high-memory operating system 112 and utilized by the first subsystem 122. The term "API set schema" refers to a data structure that allows a mapping to be obtained—at run-time—from an API set contract to an associated binary that hosts the implementation of the API set contract.

In contrast to App A, App B is a software executable that, at run-time, declares it another set of contracts including, for example, a second API set contract 130. In one implementation, the second API set contract is part of a second API set schema that is globally defined in the low-memory operating system 114.

In the particular example provided, both the first API set contract 128 and the second API set contract 130 are identified within the system by a same API set name—"foo.dll." Despite this common API set name, the first API set contract and the second API set contract may declare non-identical API sets. Further, some APIs declared by the first API set contract and the second API set contract may have identical function names, even if those functions were designed to correspond to different host binaries.

When the first subsystem 122 and the second subsystem 124 are executed on different base operating systems designed for compatibility with App A and App B, respectively, there is no ambiguity regarding which host binary corresponds to each API set contract. The high-memory operating system 112 is globally aware of a single API set schema and the low-memory operating system 114 is globally aware of a different single API set schema. However, when the first subsystem 122 and the second subsystem 124 are run on the same base operating system 120 within the processing device 102, as in FIG. 1, there then exist two different host binary files that are effectively mapped to a same API set contract. A runtime context evaluator 118 implements logic to resolve API calls of each different application to an associated one of the two different host binary files.

For example, App A and App B may, when compiled, declare consumption of the API set contract "foo.dll." At runtime for either application, the operating system 116 takes actions to determine which host binary to resolve the API set contract ("foo.dll"). To address this, the processing device 102 includes a runtime context evaluator 118 that evaluates a context of the runtime environment to determine a call context identifier usable for resolving API calls from the application to an associated host binary.

For example, the API call context identifier may determine which of the applications 110 is attempting to resolve the API set contract "foo.dll" and/or may identify a corresponding user login session in which the call was placed. Based on this call context information, the runtime context evaluator 118 selects one of multiple API set schemas that are loaded into memory space of the base operating system 120. This runtime context evaluator 118 then uses the select API set schema to resolve the received API function call to a corresponding host binary.

In the illustrated example, the runtime context evaluator 118 of FIG. 1 determines that App A is the application attempting to resolve the contract named "foo.dll" and further determines that App A is associated in memory with the first API set schema utilized by the first subsystem 122. In this case, the operating system 116 utilizes the first API set schema of the first subsystem 122 to resolve API calls placed by the application to a corresponding host binary.

Figure 2:
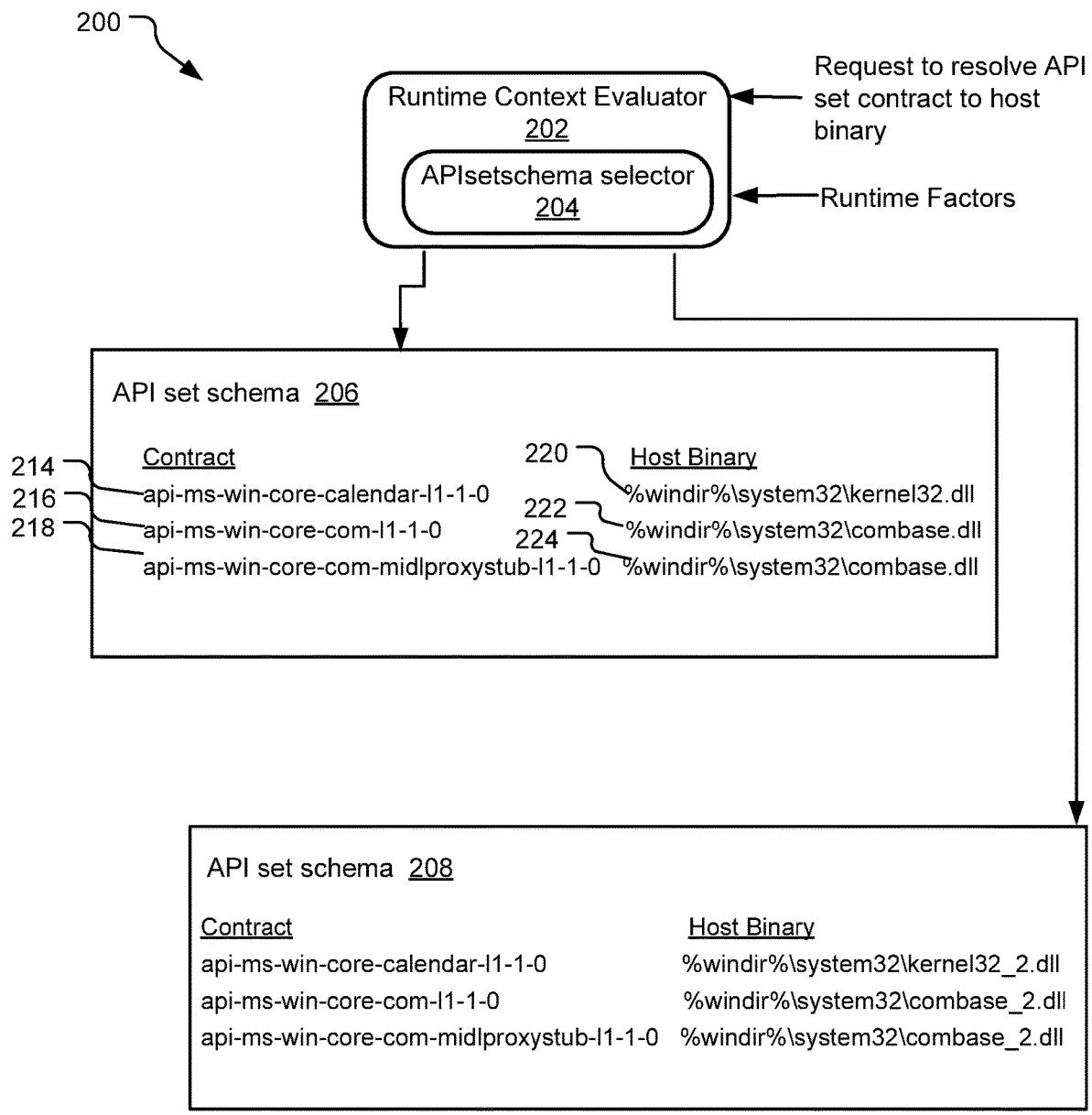
FIG. 2 illustrates aspects of another example system for side-by-side execution of same-type subsystems running on a same base operating system.

FIG. 2 illustrates aspects of another example system 200 that supports side-by-side execution of same-type subsystems on a same base operating system. The system 200 includes a runtime context evaluator 202 which is, in one implementation, is the same or similar to the runtime context evaluator 118 of FIG. 1.

The runtime context evaluator 202 includes an APIsetschema selector 204. At runtime of an application, the runtime context evaluator 202 receives an instruction to resolve an API set contract declared by the application to an associated host binary. Responsive to this instruction, the runtime context evaluator 202 evaluates one or more runtime factors to determine a call context identifier. Using the determined call context identifier, the APIsetschema selector 204 resolves the specified API set contract to one of multiple API set schemas loaded into memory of an associated device operating system.

As explained above with respect to FIG. 1, each API set contract defines a set of APIs that it exposes. For example, table 1 below illustrates a list of exemplary APIs exposed by an API set contract named "api-ms-win-core-com-L1-1-0.dll.

TABLE 1

| Contract | API |
| --- | --- |
| api-ms-win-core-com-l1-1-0.dll | CLSIDFromProgID |
| api-ms-win-core-com-l1-1-0.dll | CLSIDFromString |
| api-ms-win-core-com-l1-1-0.dll | CoAddRefServerProcess |
| api-ms-win-core-com-l1-1-0.dll | CoAllowUnmarshalerCLSID |
| api-ms-win-core-com-l1-1-0.dll | CoCancelCall |
| api-ms-win-core-com-l1-1-0.dll | CoCopyProxy |
| api-ms-win-core-com-l1-1-0.dll | CoCreateFreeThreadedMarshaler |
| api-ms-win-core-com-l1-1-0.dll | CoCreateGuid |
| api-ms-win-core-com-l1-1-0.dll | CoCreateInstance |
| api-ms-win-core-com-l1-1-0.dll | CoCreateInstanceEx |
| api-ms-win-core-com-l1-1-0.dll | CoCreateInstanceFromApp |

At compile time, an application may declare one or more API set contracts, where each declared contract defines a set of APIs called by the application. For example, table 2 below illustrates an application "notepad.exe" declaring a set of APIs called by the application as well as the API set contract name ("api-ms-win-core-com-l1-1-0.dll") that exposes each API.

TABLE 2

| Application Contract | API |
| --- | --- |
| notepad.exe api-ms-win-base-util-l1-1-0.dll | IsTextUnicode |
| notepad.exe api-ms-win-core-com-l1-1-0.dll | CoCreateFreeThreadedMarshaler |
| notepad.exe api-ms-win-core-com-l1-1-0.dll | CoCreateGuid |
| notepad.exe api-ms-win-core-com-l1-1-0.dll | CoCreateInstance |
| notepad.exe api-ms-win-core-com-l1-1-0.dll | CoInitializeEx |
| notepad.exe api-ms-win-core-com-l1-1-0.dll | CoTaskMemFree |
| notepad.exe api-ms-win-core-com-l1-1-0.dll | CoUninitialize |
| notepad.exe api-ms-win-core-com-l1-1-0.dll | CoWaitForMultipleHandles |
| notepad.exe api-ms-win-core-com-l1-1-0.dll | PropVariantClear |

At boot time, the system 200 mounts a first API set schema 206 and a second API set schema 208 within the device operating system and into kernel address space. Each of the pre-loaded API set schemas loaded into memory is a data structure usable to resolve multiple API set contracts (e.g., contracts 214, 216, 218) to an associated host binary (e.g., host binaries 220, 222, 224). In one implementation, a first API set schema 206 and a second API set schema 208 are each embedded in a portable executable (PE) file—e.g., named apisetschema_1.dll and apisetschema_2.dll, respectively, and loaded into kernel memory space.

In the example of FIG. 2, some API set contract names are duplicative included in the mapping provided by the first API set schema 206 and also in the mapping provided by the second API set schema 208. However, these different API set schemas each maps these duplicative API set names to different host binaries. For example, the first API set schema 206 maps the API set contract "api-ms-win-core-com-11-1-0" to a host binary "%windire%\system32\combase.dll" and while the second API set schema 208 maps the same API set contract "api-ms-win-core-com-11-1-0" to a different host binary "%windire%\system32\combase_2.dll."

Based on the determined call context identifier, the APIsetschema selector 204 selects one of the multiple pre-loaded API set schemas (e.g., API set schema 206 or API set schema 208) to resolve, at runtime of a particular application, the API set contract(s) declared by the application.

Figure 3:
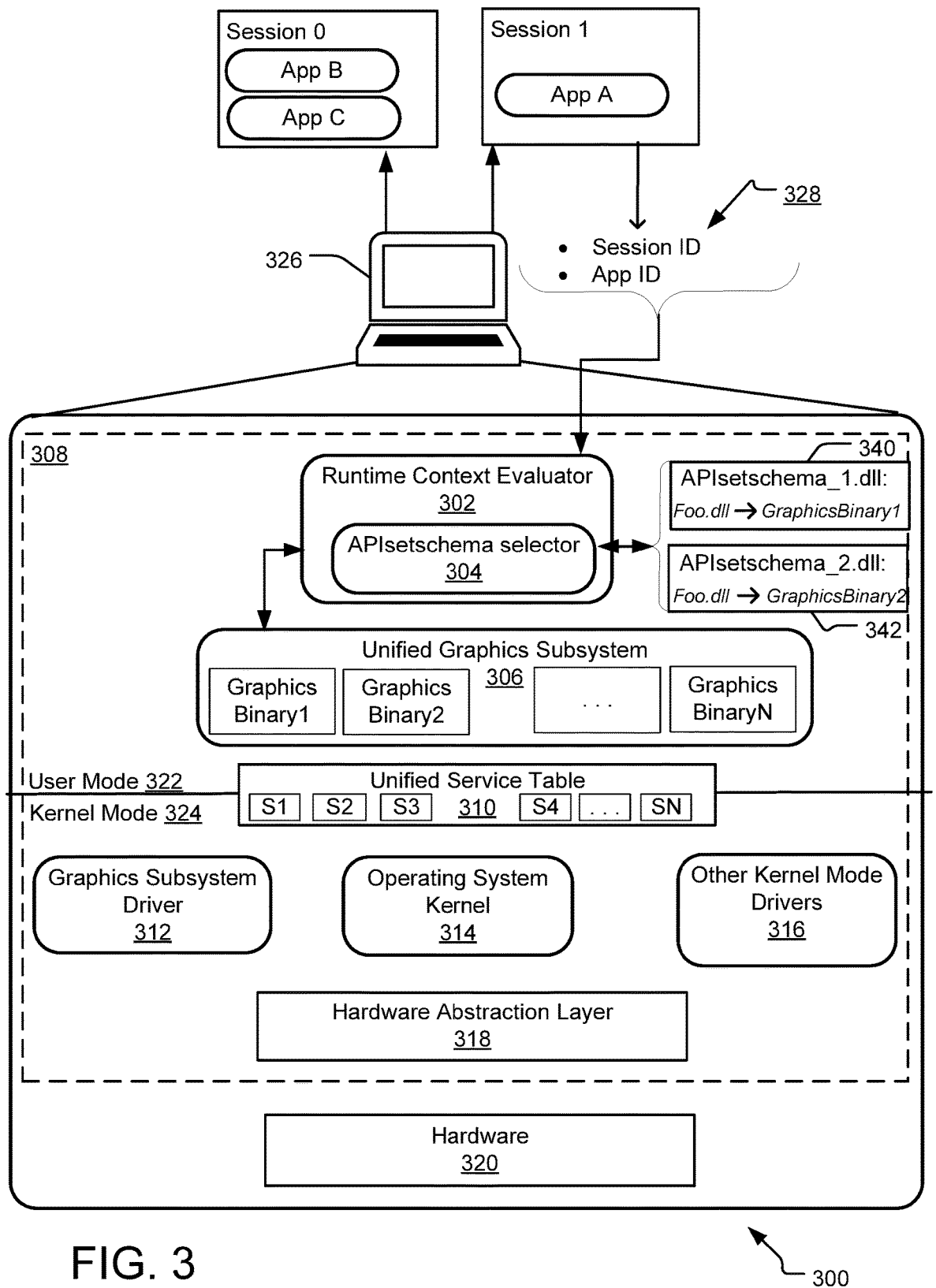
FIG. 3 illustrates another example system for side-by-side execution of different same-type subsystems running on a same base operating system.

FIG. 3 illustrates another example system 300 for side-by-side execution of different same-type subsystems running on a same base operating system. The system 300 includes a computer 326 executing an operating system 308 with a user mode 322 and a kernel mode 324. The user mode 322 includes, among other software components (not illustrated), a unified graphics subsystem 306 that includes a number of graphics binary files (e.g., GraphicsBinary1, GraphicsBinary2 . . . Graphics Binary N). In one implementation, these various graphics binary files represent graphics subsystem executables each designed to provide graphics support on a different operating system platform. Individually, each of the graphics binary files hosts the implementation of an associated API set contract that may be declared by one or more compatible applications at compilation time.

In addition to the various graphics binary files (e.g., side-by-side implementations of different graphics subsystems), the operating system 308 also includes a runtime context evaluator 302 including an APIsetschema selector 304. Responsive to each detected application launch event, the runtime context evaluator 302 determines a call context identifier based on one or more runtime factors 328 describing a runtime context (e.g., runtime environment) in which the associated application was launched.

The APIsetschema selector 304 uses the identified call context identifier to select one of multiple preloaded API set schemas 340, 342 to resolve the application's APIs to an associated host binary.

By example and without limitation, FIG. 3 illustrates the runtime factors 328 as including a session ID and/or an App ID (e.g., an application identifier). In different implementations, these runtime factors 328 may alone, in combination, or in combination with other runtime factors, serve as the call context identifier that is used to select which of the multiple preloaded API set schemas 340, 342 to use for resolving an API set contract declared by an application to an associated host binary.

In one implementation, the call context identifier includes a login session ID. In the example of FIG. 3, the operating system 308 has initialized two exemplary login sessions with session identifiers "session 0" and "session 1." A login session may be understood as consisting of all of the processes and other system objects (e.g., windows, desktops, and window stations) representing a single user's logon session. For example, session 0 may be associated with a first user account while session 1 is associated within a second user account. In another implementation, session 0 is a specialized session where the GUI components (e.g. windows, dialog boxes, popups, etc.) of interactive services are displayed in complete isolation from the desktop shell graphics and user applications in windows that are displayed in session 1.

In some implementations, the session ID identifies a container in which the associated application is launched. For example, each of the sessions (session 0, session 1) may be booted within a different container that is created by the operating system 308. In general, the term container refers to an isolated, resource controlled, and portable runtime environment which runs on a host machine or virtual machine. Each application or process that runs in a container is packaged with all the required dependencies and configuration files. In one implementation, session 1 and session 2 run in different containers that share the operating system kernel 314 and execute side-by-side without the use of a virtual machine.

In one implementation, the session ID is assigned by the operating system at session creation time to an initial process running the session (e.g., a login process). Each child and descendant process of the initial process then inherits that session ID. In one implementation where the call context identifier includes the session ID, the runtime context evaluator 302 queries the parent process responsible for launching App A during the launch sequence. From this query, the runtime context evaluator 302 determines that App A is being launched in session 1 and provides this session ID to the APIsetschema selector 304. The APIsetschema selector 304 determines that session 1 is associated in memory with a first API set schema of the multiple API set schema 340, 342 loaded in kernel memory space. Consequently, the APIsetschema selector 304 selects the first API set schema as the schema to use when resolving APIs of newly-initialized instance of App A.

In still another implementation, the runtime context evaluator 302 identifies the call context identifier on a per-application basis, such as based on an application identifier (App ID) identifying an application being launched for which API resolution is requested. For example, the APIsetschema selector 304 may implement logic to select a first API set schema when launching App A and to select a second API set schema when launching another application (e.g., App B). In one implementation, the runtime context evaluator 302 queries a database at runtime for an application that contains a list of application IDs each associated with an API set schema pre-designated for use in association with each application ID. The runtime context evaluator 302 selects the API set schema that is pre-associated in the database with an application ID for the application currently being launched.

In another implementation, the runtime context evaluator 302 uses a property attached to the application being launched to select the API set schema to use to resolve API calls placed by the application. For example, some operating systems support a "capability" property for each application. In this case, an application's capability may determine how the runtime context evaluator 302 is to select the API set schema.

In still other cases, the call context identifier is based on multiple runtime factors 328, such as session ID and app ID in combination with one another or in combination with still other factors not shown in FIG. 3 including, without limitation, factors such as the current load of the system or the quality of service level requested by the application. For example API set schema may give access to hardware that provides accelerated implementation of some functions and the API set schema may be selected based on the quality of service level requested. In one implementation, the APIsetschema selector 304 may reference a table that identifies a select one of the multiple API set schemas that is to be selected when multiple runtime factors collectively satisfy an associated defined runtime condition. For example, one exemplary runtime condition may provide for selection of the first API set schema 340 when App A is launched in containers 0 or 1 or when App B is launched in container 2. At the same time, another exemplary runtime condition may provide for selection of the second API set schema 342 when App A is launched within container 2 or when App B is launched in containers 0 or 1.

In FIG. 3, a user performs an action that triggers launch of an application (App A) within session 1. When App A is launched, App A transmits a request to the operating system to request resolution of a specified API set contract that was declared by the application at compilation time.

Upon receipt of the request to resolve a specified API set contract, the operating system employs a runtime context evaluator 302 to determine how to resolve the API set contract identified by the request. The runtime context evaluator 302 evaluates one or more of the runtime factors 328 and, based on this evaluation, determines a call context identifier. In general, the call context identifier is an identifier characterizing the context of API calls that are to be made by App A in the instance of App A that is launched by the user action that initiated the API set contract resolution request. The APIsetschema selector 304 determines which one of the multiple pre-loaded API set schema 340, 342 is associated in memory with the determined call context identifier and selects this API set schema for resolving API calls placed by the application.

A binary loader (not shown) of the operating system 308 performs the contract to host binary resolution by looking up and loading the selected API set schema selected by the runtime context evaluator 302. While the application is executing, each API function call placed by the application is resolved by the operating system 308 to a host binary identified by the selected API set schema (e.g., one of GraphicsBinary1, GraphicsBinary2 . . . GraphicsBinaryN).

In addition to the above-described components executing in the user mode 322, the operating system 308 also includes various software components executing in the kernel mode 324 to facilitate the generation of control signals to command device hardware 320 in response to the various API function calls placed by application(s) executing in the user mode 322. The kernel mode 324 represents an exemplary base operating system that provides support for side-by-side execution of same-system subsystems.

Among other components, the kernel mode 324 includes an operating system kernel 314, a graphics subsystem driver 312, and a variety of other drivers (e.g., other kernel mode drivers 316), such as file system drivers and drivers to control peripheral hardware such as a display, keyboard, etc.

In one implementation, the graphics subsystem driver 312 is a kernel-mode device driver that provides kernel mode support for the unified graphics subsystem 306. The graphics subsystem driver 312 is part of the lower-level graphics pipeline and serves as an interface between the unified graphics subsystem 306 and the device hardware 320. For example, the graphics subsystem driver 312 may control window displays, manage screen output; collect input from peripheral accessories such as a keyboard and mouse, and pass the collected inputs to user mode applications.

Notably, the graphics subsystem driver 312 may utilize an API set for communicating with a hardware abstraction layer 318 and device hardware 320 that is different than the API sets utilized in the user mode 322. For this reason, some implementations of this technology may provide a mechanism for loading multiple kernel-mode API set schemas in kernel mode memory space and selectively switching between the kernel-mode API set schemas to provide kernel-mode extensions for the processing actions initiated at the application layer in the user mode 322. For example, an indirection table (not shown) may be utilized at application runtime to dynamically select whichever one of the kernel mode API set schemas that corresponds to the user mode API set schema has been selected by the runtime context evaluator 302.

Further, the operating system 308 also includes a unified service table 310 that acts as a translation layer between user mode APIs, such as the API used by the unified graphics subsystem 306 and APIs used within the kernel mode 324. The unified service table 310 enables the shared operating system kernel 314 to serve multiple environments (e.g., same-type subsystems) and their associate API set schemas by exposing the union of the kernel-mode services called by the union of API set contract-to-host mappings across all supported API set schemas.

For example, in FIG. 3, GraphicsBinary1 may call a kernel mode service S1 while Graphics Binary2 may call a kernel mode service S2. Since the kernel mode is shared by the same-type subsystems, the unified service table 310 includes both S1 and S2. GraphicsBinary1 or GraphicsBinary2 (e.g., two same-type graphics subsystems).

Since the kernel mode 324 and unified service table 310 are shared by all subsystems within the unified graphics subsystem 306, all services in the unified service table 310 may be called by any application regardless of the selected API set schema. This creates a potential security vulnerability in that a malicious application can handcraft a call to a service that is not normally reached via the application's associated API set schema. For example, an application assigned to APIsetschema_1.dll by the runtime context evaluator 302 can directly call service S2, which is normally reachable exclusively through an application assigned to APIsetschema_2.dll.

In one implementation, the operating system 308 mitigates this potential security vulnerability by executing logic of the runtime context evaluator 302 again each time the unified service table 310 is accessed. For example, the runtime context evaluator 302 may, during an application launch sequence, evaluate one or more of the runtime factors 328 to determine that the launching application is assigned to APIsetschema_1.dll. When the application subsequently places a call to the unified service table 310 for a service S1, the runtime context evaluator 302 may again check the runtime factor(s) 328 in real time (e.g., session ID, app ID) to confirm which API set schema is selected and to verify that the selected API set schema supports the requested service S1. This real-time check may, for example, prevent an application assigned to use APIsetschema_1.dll from calling a service S2 that was designed for applications assigned to use different API set schema.

Figure 4:
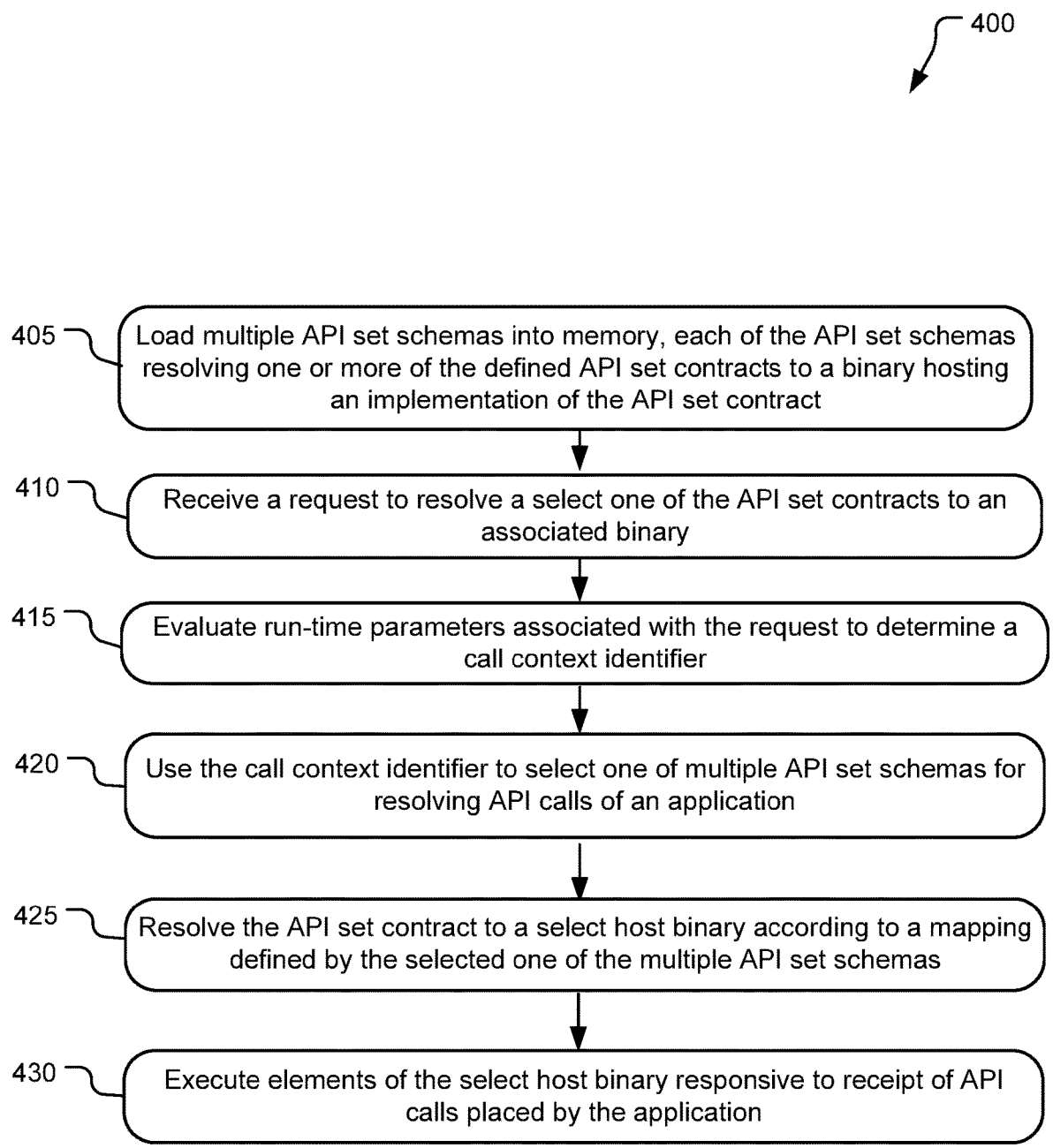
FIG. 4 illustrates example operations for side-by-side execution of same-type subsystems executing on a shared base operating system

FIG. 4 illustrates example operations 400 for side-by-side execution of same-type subsystems executing on a shared base operating system. A loading operation 405 loads multiple API set schemas into volatile memory of a device during a boot sequence. Each of the API set schemas resolves one or more API set contracts to an associated binary hosting an implementation of the contract. Each of the API set contracts included within the API set schemas declares an associated set of API functions exported by the contract.

A receiving operation 410 receives a request to resolve a select one of the API set contracts to an associated host binary. An evaluation operation 415 evaluates run-time parameters associated with the request to determine a call context identifier. A selecting operation 420 uses the determined call context identifier to select one of the multiple API set schemas for resolving the API set contract to an associated host binary. For example, the call context identifier may identify an application that placed the API set contract resolution request or a session ID for a container in which the requesting application is executing. A resolving operation 425 resolves the API set contract to a select host binary according to a mapping defined by the selected API set schema, and an execution operation 430 executes elements of the selected host binary responsive to receipt of API calls from the application.

Figure 5:
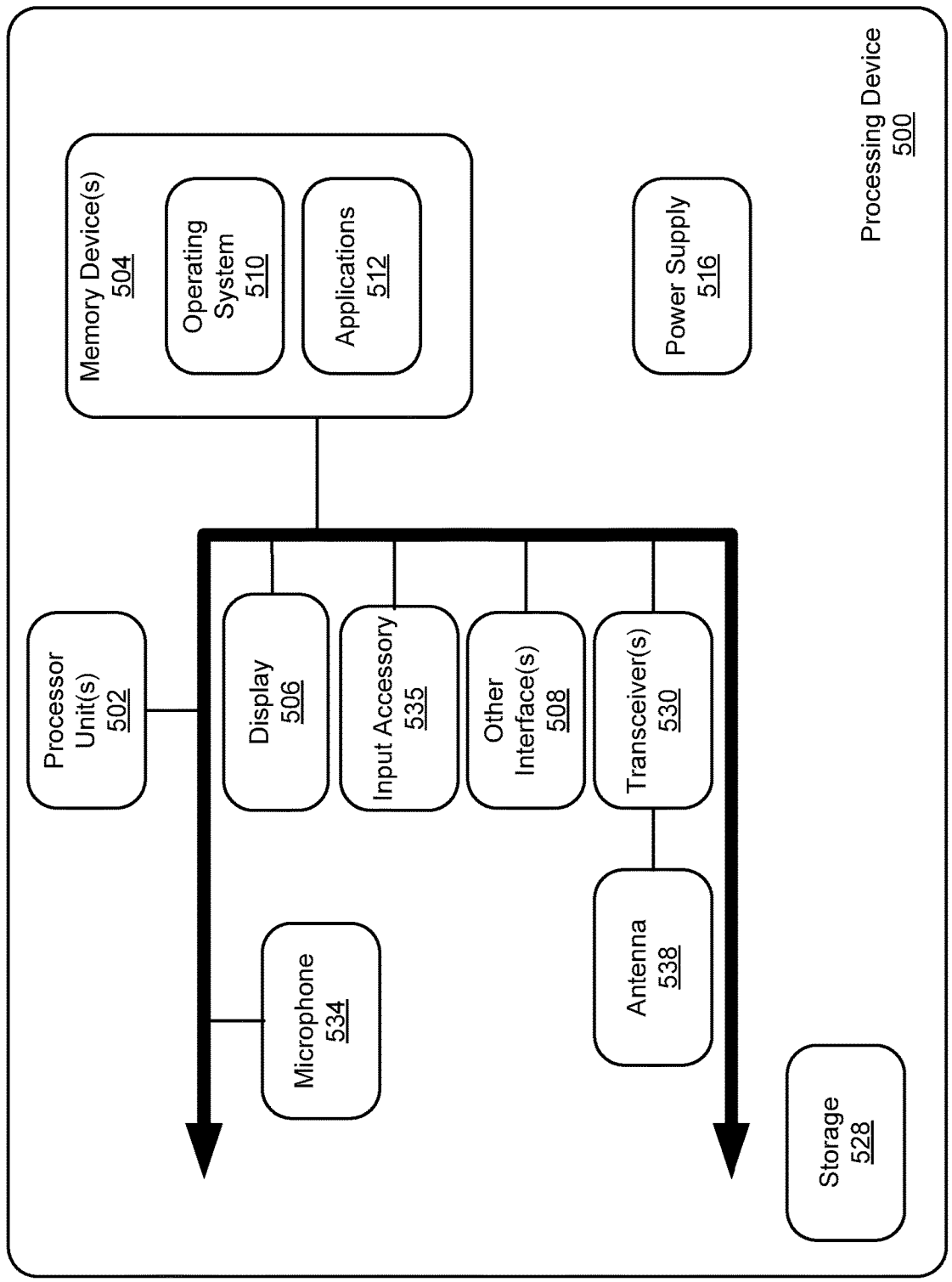
FIG. 5 illustrates an example schematic of a processing device suitable for implementing aspects of the disclosed technology.

FIG. 5 illustrates an example schematic of a processing device 500 suitable for implementing aspects of the disclosed technology. The processing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Microsoft Windows® Mobile operating system or a specific operating system designed for a gaming device, resides in the memory 504 and is executed by the processor unit(s) 502, although it should be understood that other operating systems may be employed.

One or more applications 512, are loaded in the memory 504 and executed on the operating system 510 by the processor unit(s) 502. Applications 512 may receive input from various input local devices such as a microphone 534, input accessory 535 (e.g., keypad, mouse, stylus, touchpad, gamepad, racing wheel, joystick). Additionally, the applications 512 may receive input from one or more remote devices, such as remotely-located smart devices, by communicating with such devices over a wired or wireless network using more communication transceivers 530 and an antenna 538 to provide network connectivity (e.g., a mobile phone network, Wi-Fi®, Bluetooth®). The processing device 500 may also include various other components, such as a positioning system (e.g., a global positioning satellite transceiver), one or more accelerometers, one or more cameras, an audio interface (e.g., the microphone 534, an audio amplifier and speaker and/or audio jack), and storage devices 528. Other configurations may also be employed.

The processing device 500 further includes a power supply 516, which is powered by one or more batteries or other power sources and which provides power to other components of the processing device 500. The power supply 516 may also be connected to an external power source (not shown) that overrides or recharges the built-in batteries or other power sources. In an example implementation, a task-scheduling recommendation tool may include hardware and/or software embodied by instructions stored in the memory 504 and/or the storage devices 528 and processed by the processor unit(s) 502. The memory 504 may be the memory of a host device or of an accessory that couples to the host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method disclosed herein comprises loading into memory a first application programming interface (API) set schema resolving an API set contract to a first host binary; loading into memory a second API set schema resolving the API set contract to a second different host binary; executing elements of the first host binary responsive to receipt of a API call received within a first runtime context, the API call being identified by the API set contract; and executing elements of the second different host binary responsive to receipt of the API call within a second runtime context.

Another example method according to any preceding method further comprises receiving a request to resolve the API set contract to an associated host binary file, the API set contract defining a set of APIs called by an application; evaluating a runtime context of the request to determine a call context identifier associated with the request; and selecting one of first API set schema and the second API set schema to resolve the request based on the call context identifier.

In yet another example method of any preceding method, the call context identifier includes a session identifier for a container in which the application is loaded.

In still another example method of any preceding method, the call context identifier includes an application identifier for the application that initiated the request to resolve the API set contract to the associated host binary file.

In still another example method of any preceding method, the first host binary and the second different host binary are executables of same-type subsystems that share a base operating system in a computing device.

In yet another example method of any preceding method, the first host binary and the second different host binary are graphics subsystems.

In yet still another example method of any preceding method, the base operating system includes a unified service table for interfacing between kernel-side elements in a graphics pipeline and each of the same-type subsystems.

An example system disclosed herein includes memory storing a first application programming interface (API) set schema resolving an API set contract to a first host binary and a second API set schema resolving the API set contract to a second different host binary. The system further includes an operating system that uses the first API set schema to resolve an API call placed within a first runtime context and uses the second API set schema to resolve an API call placed within a second runtime context, the API call being identified by the API set contract.

In another example system of any preceding system, the operating system includes a runtime context evaluator stored in memory and executable to: receive a request to resolve the API set contract to an associated host binary file; evaluate a runtime context of the request to determine a call context identifier associated with the request; and select one of first API set schema and the second API set schema to resolve the request based on the call context identifier.

In yet still another example system of any preceding system, the call context identifier includes a session identifier for a container in which an associated application initiated the request to resolve the API set contract to the associated host binary file.

In yet still another example system of any preceding system, the call context identifier includes an application identifier for an application that initiated the request to resolve the API set contract to the associated host binary file.

In still another example system of any preceding system, the first host binary and the second different host binary are executables of same-type subsystems that share a base operating system in a computing device.

In still another example system of any preceding system, the first host binary and the second different host binary are graphics subsystems.

In yet still another example system of any preceding system, the base operating system includes a unified service table for interfacing between kernel-side elements in a graphics pipeline and each of the same-type subsystems.

An example memory device disclosed herein encodes processor-executable instructions for executing a computer process comprising: loading into memory a first application programming interface (API) set schema resolving an API set contract to a first host binary; loading into memory a second API set schema resolving the API set contract to a second different host binary; executing elements of the first host binary responsive to receipt of a API call placed within a first runtime context, the API call being identified by the API set contract; and executing elements of the second different host binary responsive to receipt of an API call placed within a second runtime context.

On another example memory device of any preceding memory device, the computer process further comprises: receiving a request to resolve the API set contract to an associated host binary file, the API set contract defining a set of APIs called by an application; evaluating a runtime context of the request to determine a call context identifier associated with the request; and selecting one of first API set schema and the second API set schema to resolve the request based on the call context identifier.

In yet still another example memory device of any preceding memory device, the call context identifier includes a session identifier for a container in which the application is loaded.

In yet still another example memory device of any preceding memory device, the call context identifier includes an application identifier for the application that initiated the request to resolve the API set contract to the associated host binary file.

In yet still another example memory device of any preceding memory device, the first host binary and the second different host binary are executables of same-type subsystems that share a base operating system in a computing device.

In still another example memory device of any preceding memory device, the first host binary and the second different host binary are graphics subsystems.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:
   loading into memory a first application programming interface (API) set schema resolving an API set contract to a first host binary;
   loading into the memory a second API set schema resolving the API set contract to a second different host binary;
   receiving an API call including a request to resolve the API set contract to an associated host binary file, the API set contract defining a set of APIs called by an application;
   evaluating a runtime context of the API call to determine a call context identifier associated with the request, the call context identifier including a session identifier for a container in which the application is loaded;
   using information external to the API call to select one of first API set schema and the second API set schema, the external information including the call context identifier;
   executing elements of the first host binary instead of the second host binary responsive to selecting the first API set schema; and
   executing elements of the second different host binary instead of the first host binary responsive to selecting the second API set schema.

2. The method of claim 1, wherein the first host binary and the second different host binary are executables of same-type subsystems that share a base operating system in a computing device.

3. The method of claim 1, wherein the first host binary and the second different host binary are graphics subsystems.

4. The method of claim 2, wherein the base operating system includes a unified service table for interfacing between kernel-side elements in a graphics pipeline and each of the same-type subsystems.

5. A system comprising:
   memory storing a first application programming interface (API) set schema resolving an API set contract to a first host binary and a second API set schema resolving the API set contract to a second different host binary; and
   an operating system adapted to:
   receive an API call including a request to resolve the API set contract to an associated host binary file;
   evaluate a runtime context of the request to determine a call context identifier associated with the request, the call context identifier including a session identifier for a container in which an associated application was loaded at a time that the associated application initiated the request to resolve the API set contract to the associated host binary file;
   use information external to the API call to select one of first API set schema and the second API set schema, the information external to the API call including the call context identifier;
   use the first API set schema to resolve the API call responsive to selecting the first API set schema;
   use the second API set schema to resolve the API call responsive to selecting the second API set schema.

6. The system of claim 5, wherein the first host binary and the second different host binary are executables of same-type subsystems that share a base operating system in a computing device.

7. The system of claim 6, wherein the base operating system includes a unified service table for interfacing between kernel-side elements in a graphics pipeline and each of the same-type subsystems.

8. The system of claim 5, wherein the first host binary and the second different host binary are graphics subsystems.

9. One or more memory devices encoding processor-executable instructions for executing a computer process, the computer process comprising:

loading into memory a first application programming interface (API) set schema resolving an API set contract to a first host binary;

loading into the memory a second API set schema resolving the API set contract to a second different host binary;

receiving an API call including a request to resolve the API set contract to an associated host binary file, the API set contract defining a set of APIs called by an application;

evaluating a runtime context of the API call to determine a call context identifier associated with the request, the call context identifier including a session identifier for a container in which the application is loaded;

using information external to the API call select one of first API set schema and the second API set schema, the information external to the API call including the call context identifier;

executing elements of the first host binary instead of the second host binary responsive to selecting the first API set schema; and executing elements of the second different host binary instead of the first host binary responsive to selecting the second API set schema.

10. The one or more memory devices of claim 9, wherein the first host binary and the second different host binary are executables of same-type subsystems that share a base operating system in a computing device.

11. The one or more memory devices of claim 9, wherein the first host binary and the second different host binary are graphics subsystems.

* * * * *